United States Patent
Pandit et al.

(10) Patent No.: US 9,719,799 B2
(45) Date of Patent: Aug. 1, 2017

(54) NEXT GENERATION ELECTRONIC FLIGHT BAG

(75) Inventors: Anil Kumar Pandit, Karnataka (IN); Srikanth Rao, Karnataka (IN); Nayyar Azam Khan Rao, Karnataka (IN); Nagaraj Sham Bhat, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 2565 days.

(21) Appl. No.: 12/333,946

(22) Filed: Dec. 12, 2008

(65) Prior Publication Data

US 2010/0152924 A1    Jun. 17, 2010

(51) Int. Cl.
*G06F 19/00* (2011.01)
*G01C 23/00* (2006.01)
*G07C 5/08* (2006.01)
*B64D 45/00* (2006.01)

(52) U.S. Cl.
CPC .......... *G01C 23/00* (2013.01); *G07C 5/0808* (2013.01); *G07C 5/0841* (2013.01); *B64D 2045/0075* (2013.01)

(58) Field of Classification Search
USPC .......... 701/33, 29, 35; 709/224; 340/853.2, 340/945; 704/260, 270; 700/94
See application file for complete search history.

(56) References Cited

U.S. PATENT DOCUMENTS

| 6,122,575 A | 9/2000 | Schmidt et al. | |
| 6,154,151 A | 11/2000 | McElreath et al. | |
| 6,661,353 B1 | 12/2003 | Gopen | |
| 6,842,122 B1 | 1/2005 | Langner et al. | |
| 7,149,612 B2* | 12/2006 | Stefani | G01D 9/005 701/29.1 |
| 7,289,890 B2* | 10/2007 | Mitchell | G06Q 50/30 340/438 |

(Continued)

FOREIGN PATENT DOCUMENTS

| FR | 0755789 | * | 6/2007 |
| GB | 2050979 A | | 1/1981 |

(Continued)

OTHER PUBLICATIONS

Austin, Joseph, Master Monitor Display Application for F-14, Accession No. ADA041570, Grumman Aerospace Corporation Bethpage NY Power Optics and Displays Dept. (Mar. 25, 1977).*

(Continued)

*Primary Examiner* — Jean-Paul Cass
(74) *Attorney, Agent, or Firm* — Lorenz & Kopf, LLP (57) ABSTRACT

An electronic flight bag for an aircraft includes a display device and a processing system. The display device is operable to render various images. The processing system is in operable communication with the display. The processing system is configured to receive various types of data from various aircraft systems and is operable, upon receipt of the data, to supply display commands to the display device that cause the display device to automatically render various images. These images may include, among other things, flight manual pages, checklists, approach charts, maintenance data, and various navigation displays. The electronic flight bag may also implement the functions of various other aircraft systems and devices.

21 Claims, 5 Drawing Sheets

(56) References Cited

U.S. PATENT DOCUMENTS

| | | |
|---|---|---|
| 2002/0120375 A1 | 8/2002 | Draoullec et al. |
| 2002/0138185 A1* | 9/2002 | Trsar ............... G07C 5/0808 701/29.1 |
| 2003/0093187 A1* | 5/2003 | Walker ............... B64C 13/20 701/1 |
| 2003/0167111 A1* | 9/2003 | Kipersztok ....... G05B 23/0278 702/185 |
| 2005/0024237 A1 | 2/2005 | Gannett |
| 2005/0149238 A1* | 7/2005 | Stefani et al. .................. 701/33 |
| 2006/0112119 A1* | 5/2006 | Vian ...................... G07C 5/085 |
| 2006/0243857 A1 | 11/2006 | Rado |
| 2007/0033277 A1* | 2/2007 | Yukawa et al. ............... 709/224 |
| 2007/0042727 A1 | 2/2007 | Stefani |
| 2007/0115938 A1 | 5/2007 | Conzachi et al. |
| 2007/0150119 A1* | 6/2007 | Mitchell et al. .................. 701/1 |
| 2007/0183435 A1 | 8/2007 | Kettering et al. |
| 2007/0219676 A1 | 9/2007 | Allen et al. |
| 2007/0294002 A1* | 12/2007 | Underdal ................ G07C 5/08 701/29.1 |
| 2008/0215193 A1 | 9/2008 | Hanson |
| 2009/0204243 A1* | 8/2009 | Marwaha et al. .............. 700/94 |
| 2010/0198431 A1* | 8/2010 | Corbefin ............ G05B 23/0272 701/3 |

FOREIGN PATENT DOCUMENTS

| | | |
|---|---|---|
| GB | 2420646 A | 5/2006 |
| JP | 02036469 | 2/1990 |

OTHER PUBLICATIONS

EP Search Report, EP 09177675.7-1236/2196775 dated Jan. 19, 2012.
EP Communication, EP 09177675.7-1236 dated Jul. 16, 2012.
EP search report, EP 09177675.7-1236/2196775 dated May 29, 2012.
EP Communication, EP 09177675.7-1557 dated Mar. 19, 2013.
EP Extended Search report for EP Divisional Application No. 15160625.8 dated Aug. 24, 2015.
EP Examination Report for Application No. 15 160 625.8-1557 dated Apr. 4, 2017.

* cited by examiner

NEXT GENERATION ELECTRONIC FLIGHT BAG

TECHNICAL FIELD

The present invention generally relates to electronic flight bags and, more particularly, to an electronic flight bag with improved processing, display, and communications capabilities.

BACKGROUND

An Electronic Flight Bag (EFB) is a device that allows a flight crew to easily and efficiently perform various flight management tasks. The EFB derives its name from the traditional flight bag carried by a pilot onto the aircraft. The flight bag typically included various paper-based reference materials, such as the Aircraft Operating Manual, the Aircrew Operating Manual, and various Navigational Charts. An EFB is typically implemented as a general purpose computing platform, and one of the major advantages it provides is the reduction or replacement of the various paper-based reference materials.

More recently, EFBs are being configured to host a wide array of applications. The applications include document viewer applications, electronic checklists (ECL), flight performance calculations, non-interactive electronic approach charts, head-down display for Enhanced Vision Systems (EVS), Synthetic Vision Systems (SVS) or video cameras, and real-time weather data display, just to name a few. Although quite useful, many of these functions are redundant to those that are already implemented in other aircraft avionics devices. Such redundancy can increase overall aircraft and system costs and may also increase installation complexity due to wiring and certification costs. Moreover, many functions presently provided by EFBs may not be implemented in a manner that most efficiently reduces pilot workload. Moreover, various other useful functions are not implemented in current EFBs or other aircraft avionics systems.

Accordingly, there is a need for an EFB that implements various functions in a cost-effective and efficient manner. The present invention addresses at least this need.

BRIEF SUMMARY

In one embodiment, and by way of example only, an electronic flight bag for an aircraft that has an associated flight manual includes a display device and a processing system. The display device is coupled to receive display commands and is operable, in response thereto, to render various images. The processing system is in operable communication with the display. The processing system is configured to receive fault data from one or more aircraft systems and is operable, upon receipt of the fault data, to determine a page in the associated flight manual that corresponds to the received fault data and supply display commands to the display device that cause the display device to automatically render an image of the determined page in the associated flight manual.

Furthermore, other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
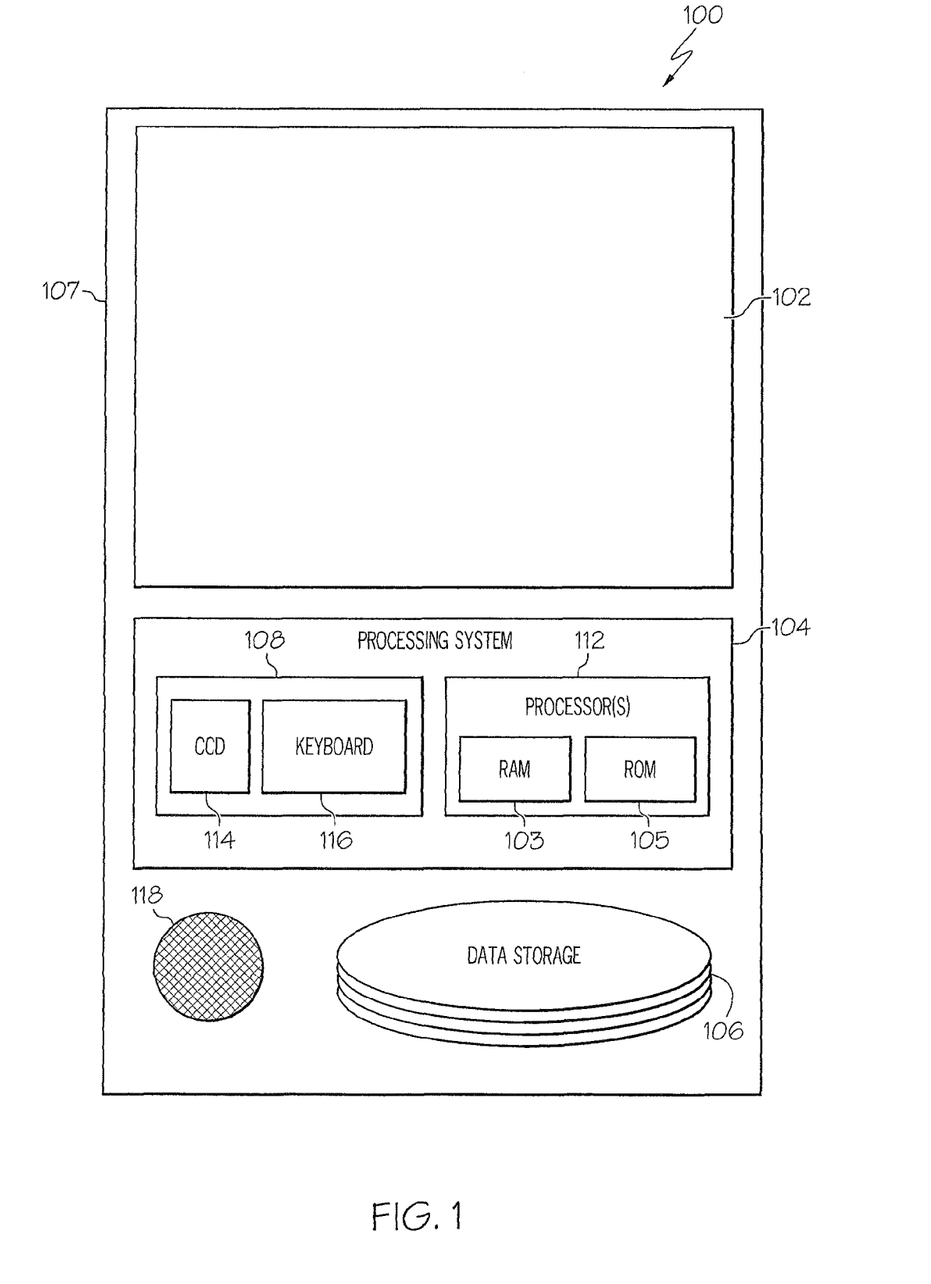
FIG. 1 depicts a functional block diagram of an exemplary electronic flight bag (EFB) according to an embodiment of the present invention.

Referring to FIG. 1, a functional block diagram of an exemplary embodiment of an electronic flight bag (EFB) 100 is depicted. The EFB 100 includes a display device 102, a processing system 104, and a data storage device 106, preferably disposed within a common housing 107. Depending upon the particular configuration of the EFB 100, it may be configured as a portable device that may be selectively interfaced with aircraft systems or it may be permanently installed within an aircraft. The display device 102 is in operable communication with the processing system 104 and, in response to display commands received therefrom, displays various images. It will be appreciated that the display device 102 may be any one of numerous known displays suitable for rendering graphic, icon, and/or textual images in a format viewable by a user. Non-limiting examples of such displays include various cathode ray tube (CRT) displays, and various flat panel displays such as, for example, various types of LCD (liquid crystal display) and TFT (thin film transistor) displays.

The processing system 104, at least in the depicted embodiment, includes a user interface 108 and one or more processors 112 (for clarity, only one shown). The user interface 108 is in operable communication with the processor 112 and is configured to receive input from a user and, in response to the user input, supply various signals to the processor 112. The user interface 108 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 108 includes at least a CCD 114 and a keyboard 116. A user may use the CCD 114 to, among other things, move a cursor symbol over, and select, various items rendered on the display device 102, and may use the keyboard 116 to, among other things, input various data.

The processor 112 is in operable communication with the data storage device 106, the display device 102, and the user interface 108 via one or more non-illustrated communication busses. The processor 112 is configured to be responsive to user input supplied to the user interface 108 and to various data supplied from external equipment and devices to, among other things, selectively retrieve data from data storage device 106, and to command the display device 102 to render various graphical, icon, and/or textual images. The processor 112 may include one or more microprocessors, each of which may be any one of numerous known general-purpose microprocessors or application specific processors that operate in response to program instructions. In the depicted embodiment, the processor 112 includes on-board RAM (random access memory) 103 and on-board ROM (read only memory) 105. The program instructions that control the processor 112 may be stored in either or both the RAM 103 and the ROM 105, or on another non-illustrated device. It will be appreciated that this is merely exemplary of one scheme for storing operating system software and software routines, and that various other storage schemes may be implemented. It will also be appreciated that the processor 112 may be implemented using various other circuits, not just one or more programmable processors. For example, digital logic circuits and analog signal processing circuits could also be used.

The data storage device 106, as noted above, is in operable communication with the processor 104. The data storage device 106 may have various software routines stored thereon that allow the EFB 100 to implement one or more of the processes that are described further below. The data storage device 106 also has various data stored thereon. These data include, for example, the aircraft operating manual, the aircrew operating manual, various navigational charts, various aircraft approach charts, and various electronic checklists (ECL), just to name a few. As will also be described further below, the data storage device 106 may also receive and store, at least temporarily, health data from various line replaceable units (LRUs) installed in an aircraft.

It will be appreciated that the data storage device 106 may be implemented using any one or more of numerous suitable devices for receiving and storing data. Some non-limiting examples include static memory, magnetic disks, hard drives, floppy drives, thumb drives, compact disks, and the like. In addition, portions of the data storage device 106 may be disposed separately from the EFB 100. Preferably, however, the data storage device 106 is fully integrated into the EFB 100 and thus disposed wholly within the common housing 108.

Figure 2:
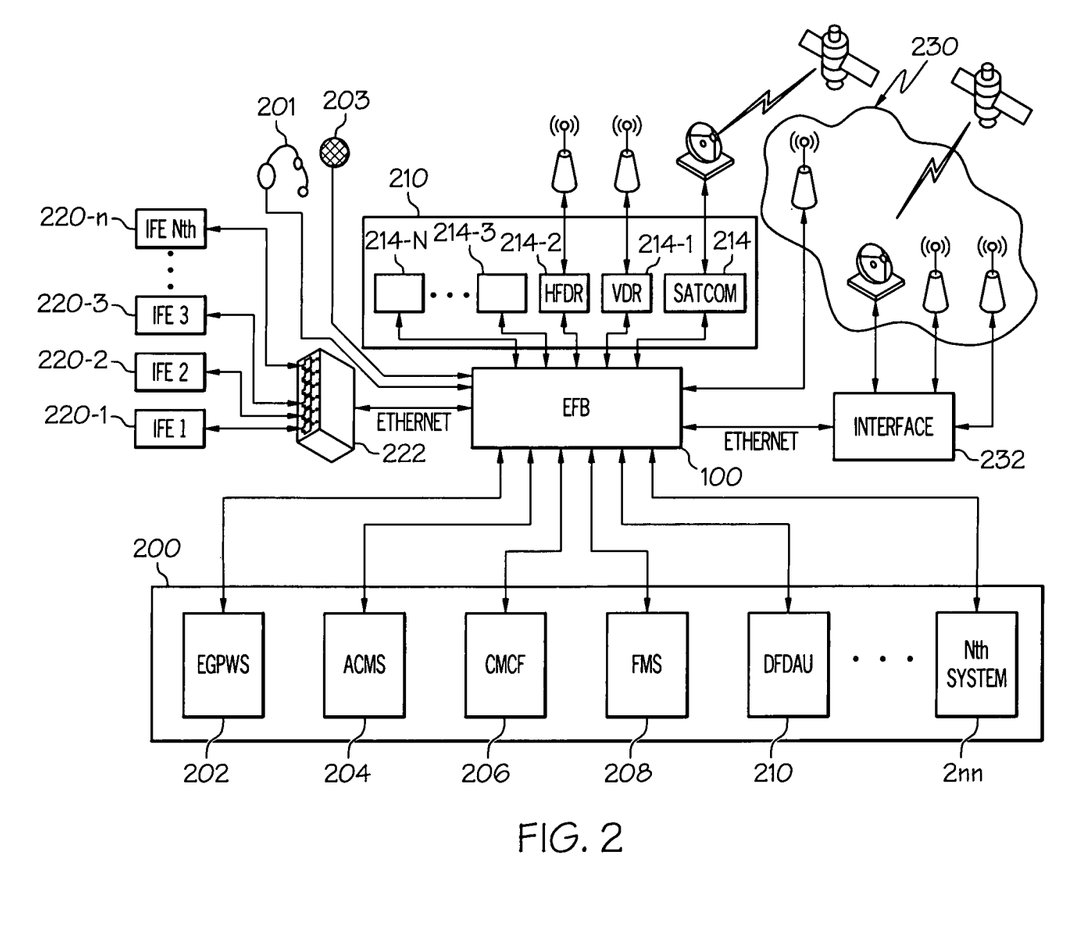
FIG. 2 depicts a functional block diagram of the exemplary EFB of FIG. 1 installed in an aircraft.

Turning now to FIG. 2, a functional block diagram of the exemplary EFB 100 described above is depicted installed in an aircraft. In the embodiment depicted in FIG. 2, the EFB 100 is implemented as a Class 3 type EFB. As is generally known, EFBs may be classified into one of three different classes, Class 1, Class 2, or Class 3. Class 1 EFBs may be implemented using commercial-off-the-shelf (COTS) equipment, such as a laptop or a handheld electronic device, and are considered portable electronic devices (PEDs). Class 1 EFBs are generally considered loose equipment, are typically stowed during critical phases of flight, may connect to aircraft power, and may interface to other systems via certified docking stations and/or power sources. Class 2 EFBs are also PEDs, but are typically mounted in the aircraft cockpit using certified structural mounting devices or kneeboard devices. Class 2 EFBs are typically mounted in the aircraft with the display being viewable to the pilot during all phases of flight, may connect to aircraft power and data sources, and can be used for bi-directional data communication with other aircraft systems. Class 3 EFBs are considered installed equipment and are thus subject to various airworthiness requirements.

No matter its particular classification, it is seen that the EFB 100 is in operable communication with a plurality of aircraft avionics systems 200, a plurality of communications systems 210, the in-flight entertainment (IFE) system 220, and a plurality of wireless networks 230. Although the number and type of avionics systems 200 may vary, in the embodiment depicted in FIG. 2, the EFB 100 is in operable communication, preferably via one or more suitable communications buses (e.g., ARINC 429), with one or more of an enhanced ground proximity warning system (EGPWS) 202, an aircraft condition monitoring system (ACMS) 204, a central maintenance computation function (CMCF) 206, a flight management system (FMS) 208, and a flight data acquisition unit (FDAU) 212. For completeness, each of these avionics systems will be briefly described.

The EGPWS 202 monitors aircraft location and altitude and, in combination with terrain data, allows for the display of surrounding terrain. The EGPWS 202 will also generate an audible alert if the aircraft approaches terrain, a body of water, or a tall structure. The ACMS 204 receives data from, for example, a plurality of non-illustrated sensors distributed throughout the aircraft and, based on these data, supplies data representative of engine, aircraft, and operational conditions. The ACMS 204 may also generate one or more faults or warnings associated with the engine, aircraft, and operational conditions. Some non-limiting examples of data supplied to the ACMS include aircraft speed, altitude, position, heading, engine rotor speeds, various temperatures, and various pressures, just to name a few.

The CMCF 206, among various other functions, receives, stores, and interprets existing faults in various line replaceable units (LRUs), flight deck effects, and other maintenance-related data that are generated and supplied from various LRUs installed in the aircraft. The CMCF 206 may also be used to selectively initiate ground tests and selectively interrogate the LRUs to ascertain the current software and/or hardware versions installed in the LRUs, as well as the LRU serial numbers and part numbers. The FMS 208 allows a flight crew to input and store an aircraft flight plan, and to modify the stored flight plan, if needed or desired, in flight. The FMS 208 receives sensor data from various navigation sensors and, based upon these data and the current flight plan, automatically navigate the aircraft along the flight plan. The FMS 208 may additionally supply display commands that cause a display device to render the flight plan. The FDAU 212 receives parametric flight information about various aircraft systems and sends these data to the non-illustrated flight data recorder (FDR).

Before proceeding further, it is noted that the above-described avionics systems 200 are merely exemplary of the numerous and varied aircraft avionics systems that may be used to supply various data to the EFB 100. Thus, FIG. 2 also depicts an additional block labeled "Nth SYSTEM" to denote that additional or other avionics systems may be in communication with the EFB 100. Moreover, while each of the above-described avionics systems is depicted and described as separate physical entities, it will be appreciated that one or more of the functions implemented by these systems may be integrated together into physical entities that may or may not be depicted herein.

Returning once again to the description, it was noted above that the EFB 100 is also in operable communication with a plurality of communications systems 210 and wireless sub-networks 230. In particular, the EFB 100 is in operable communication, via a suitable communication bus (e.g., ARINC-429) and appropriate communication ports, with a plurality of radio frequency (RF) (including both HF and VHF) communication devices 214 (e.g., 214-1, 214-2, 214-3 . . . , 214-N) and a satellite communications (SATCOM) communication device 216. It will be appreciated that the number and type of communication devices may vary from system to system and aircraft to aircraft, and that those depicted and described herein are merely exemplary. It will additionally be appreciated that communication with the communications systems 210 may take place via the aircraft communications management unit (CMU), if the aircraft is so equipped.

As FIG. 2 also shows, the EFB 100 is in communication with, or is at least configured to be selectively in communication with, a plurality of wireless sub-networks 230 (e.g., 230-1, 230-2, 230-3 . . . , 230-N). It will be appreciated that the number, types, and functions of the wireless sub-networks 230 may vary. For example, the wireless sub-networks may include various WiFi networks, various WiMAX networks, various wireless IP networks, or any other wireless network protocol now known or developed in the future. Moreover, the EFB 100 may be configured to access the wireless sub-networks via any one, or plurality, of suitable devices including USB, Ethernet, or PCMCIA devices, just to name a few. The EFB may interface with all of the wireless sub-networks 230 via one or more internal interfaces, via an external interface 232 or, as FIG. 2 depicts, a combination of both.

The IFE 220, as is generally known, may be used to provide various types of entertainment or other content to aircraft passengers in video form, audio form, both. The IFE 220 may also be used to supply, in video form, audio form, or both, pilot communications to aircraft passengers. The IFE 220 is preferably in operable communication with the EFB 100 via a suitable communication link, which may be a wired link or a wireless link. The types of information and/or data supplied to the IFE from the EFB 100 will be described in more detail further below.

The EFB 100 described herein may be configured to implement various pilot aid functions, various communications-related functions, and various maintenance-related functions. The EFB 100 may be configured to implement only selected ones or all of the pilot aid functions, communications-related functions, and maintenance-related functions, various combinations of the pilot aid functions, communications-related functions, and maintenance-related functions, or all of these functions simultaneously. Each of the pilot aid functions, communications-related functions, and maintenance-related functions will be described in turn, beginning with the pilot aid functions.

EFB Pilot Aid Functions

It was noted above that the ACMS 204 and the CMCF 206 may each generate various faults or warnings. These faults or warnings are typically indicative of a potential issue with one or more systems, devices, or components within the aircraft. Most, if not all, of these potential issues may be resolved by reference to an appropriate page in a flight manual (e.g., the aircraft operating manual or the aircrew operating manual) or to an appropriate checklist. The EFB 100 is thus coupled to receive fault data from, for example, the ACMS 204 and/or CMCF 206 and is configured, upon receipt of the fault data, to automatically render an image of the determined page in the associated flight manual or an image of the appropriate checklist. More specifically, and as shown in flowchart form in FIG. 3, the processing system 104 in the EFB 100 continuously determines whether fault data have been received (302). Upon receipt of fault data, the processing system determines the page in the associated flight manual (or the appropriate checklist) that corresponds to the received fault data (304). The processing system 104 also supplies display commands to the display device 102 that cause the display device 102 to automatically render the image of the determined page in the associated flight manual (or the image of the appropriate checklist) (306).

Figure 3:
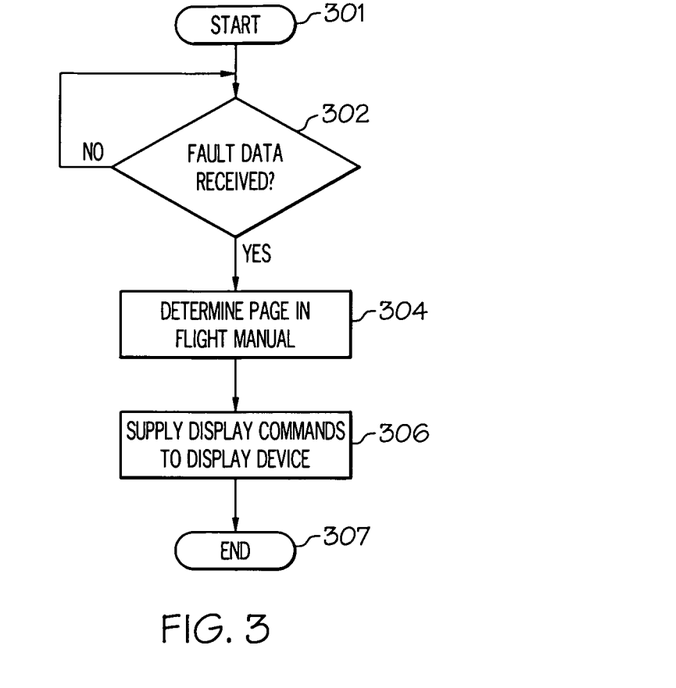
FIG. 3 depicts a process, in flowchart form, for selectively displaying pages in a flight manual using the EFB of FIG. 1.

In addition to automatically displaying the appropriate page in the flight manual (or the appropriate checklist) in response to a fault, the EFB 100 may also be configured to automatically display an appropriate page in the flight manual (or the appropriate checklist) based on the movement phase of the aircraft. In many aircraft, automatic movement messages are transmitted based on the movement phase of the aircraft. The movement phases, and associated messages, are generally referred to using the acronym OOOI, which stands for Out, Off, On, In. An aircraft is in the "Out" phase whenever it is leaving the gate or its parking position. An aircraft is in the "Off" phase during take-off, and it the "On" phase during touch down. An aircraft is in the "In" phase whenever it arrives at the gate or its parking position. Thus, the EFB 100, or more specifically the processing system 104 in the EFB 100, is further coupled to receive data representative of aircraft movement phase. These data may be supplied from various sensors and systems within the aircraft. For example, these data may be supplied from parking brakes, door sensors, landing gear sensors, and air/ground sensors, just to name a few. The processing system 104, in response to the movement data, supplies display commands to the display device 102 that cause the display device 102 to render a checklist from the associated flight manual that is appropriate for the aircraft flight phase.

In addition to automatically displaying the appropriate page in the flight manual (or the appropriate checklist), the EFB 100 may, at least in some embodiments, play one or more appropriate video files for the pilot. The video files, which are preferably stored in the data storage device 106, preferably show the pilot (or other flight crew member) the appropriate corrective or mitigating operation (or operations), consistent with the appropriate flight manual page (or checklist), to be taken in response to the fault. It will be appreciated that this feature may be initiated automatically or manually, the preference of which may be set by a flight crew.

In addition to or instead of playing an appropriate video file, the processing system 104 in the EFB 100 may also be configured to at least selectively provide audio instructions to the flight crew consistent with the displayed flight manual page. That is, the processing system 104 in the EFB 100 could implement a text-to-voice converter that reads the displayed flight manual page, or at least portions of the displayed page, and converts it to speech data representative of the text. The speech data may then be supplied to, for example, an audio sound generator (e.g., a speaker) 118 (see FIG. 1) to generate audible sounds representative of the speech data.

The text-to-voice functionality described above may also be used for text-based communications received from a ground station, such as an air traffic control station. For example, during certain aircraft operations air traffic control may transmit text-based messages to an aircraft in lieu of voice communications. These text-based messages are displayed as text on a display unit. At times, it may be more efficient for a pilot to not have to concentrate on reading such textual messages. In this regard, the EFB 100 may be configured to at least selectively convert such textual messages to voice so that the pilot may audibly hear the message content rather than read the message.

Consistent with the above, it may be appreciated that a pilot may need to transmit text-based messages to, for example, air traffic control, in response to a received text-based message. Again, there may be times in which it may be more efficient for a pilot to not have to concentrate on typing in such textual responses. In this regard, the EFB 100 may be configured to at least selectively implement voice-to-text conversion. That is, when the pilot speaks into, for example, a microphone on a non-illustrated headset, the EFB 100 will convert the pilot's voice into appropriate textual data, using any one of numerous known voice-to-text conversion software packages, for transmission to the ground. It will be appreciated that the voice-to-text conversion may also be used to relay messages to passengers via, for example, the IFE 220.

Figure 4:
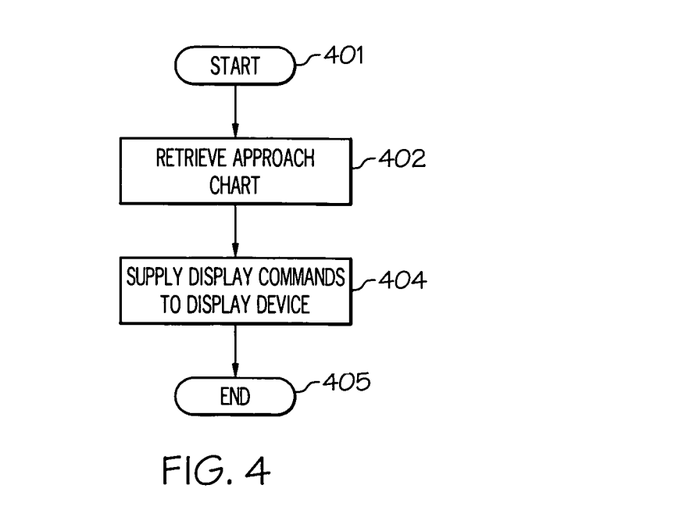
FIG. 4 depicts a process, in flowchart form, for displaying planned and actual approach paths on the EFB of FIG. 1.
Figure 5:
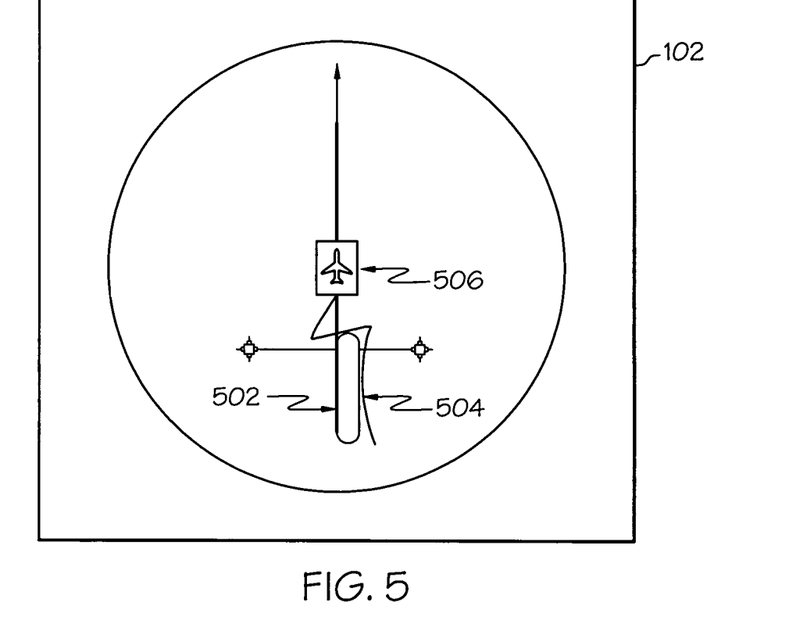
FIG. 5 depicts an exemplary manner in which the planned and actual approach paths may be rendered on the EFB.

The EFB 100 may also be used to provide pilot aid during an aircraft approach and landing procedure. More specifically, the EFB 100 is configured to at least selectively display the planned approach path and the actual approach path of the aircraft. As depicted in flowchart form in FIG. 4, the processing system 104, prior to initiating an approach procedure, is commanded to retrieve the appropriate approach chart from the data storage device 106 (402). The processing system 104 supplies display commands to the display device 102 that causes the display device 102 to render an image of the retrieved approach chart (404). The processing system 104 also supplies display commands to the display device 102 that cause the display device 102 to render other images overlaid onto the approach chart. In particular, and as shown in FIG. 5, the processing system 104 commands the display device 102 to render images of the planned approach path 502, the actual approach path 504, and present aircraft position 506.

To implement the above-described functionality, the EFB 100 receives aircraft position data from, for example, a non-illustrated global positioning system (GPS) receiver. For example, many aircraft include a Global Navigation Satellite System (GNSS) receiver that receives satellite transmissions and provides autonomous geo-spatial positioning data. The EFB 100 also receives planned approach data from, for example, the FMS 208 or other suitable system, and navigation data from various systems and sensors. The processing system 104 in the EFB 100 processes all of these data, and commands the display device 102 to render, in real-time, the planned approach path 502, the actual approach path 504, and actual aircraft position 506. As a result, the EFB 100 provides real-time spatial correspondence between the planned and actual approach paths. Such increased situational awareness provides the ability to more accurately recognize the need to take any corrective action, and to do so with relatively shorter reaction times.

It will be appreciated that the manner in which the planned approach path 502, the actual approach path 504, and actual aircraft position 506 are rendered on the display device may vary. In the depicted embodiment, however, different colors are used. For example, the intended approach path 502 may be rendered in green, the actual approach path 504 may be rendered in yellow, and the actual aircraft position 506 may be rendered using a blue colored aircraft icon. It will additionally be appreciated that the approach chart may be rendered, in some embodiments, as a three-dimensional perspective view map. For such embodiments, the rendered view may be an out-the-window view from the perspective of the pilot.

The FMS 208, as noted above, is used to input, store, and modify the aircraft flight plan, and to automatically navigate the aircraft along the flight plan. In most aircraft, the current flight plan is displayed on the aircraft navigation display (ND). Moreover, any modifications to the flight plan are also displayed on the ND. Until the modified flight plan is set as the active flight plan, the current and modified flight plans are simultaneously displayed. As is also known, the ND is used to display numerous other types of information to the flight crew. During some relatively busy cockpit operations, such as pre-flight and in-flight flight plan run through activities, variations in the information displayed on the ND can be quite voluminous, while the EFB 100 may be relatively in active or non-active. In such instances, the EFB 100 may be selectively configured to receive and display flight plan data from the FMS 208, while the ND can be used to display other data, thereby providing enhanced situational awareness, and improve overall display utilization and efficiency.

The EFB 100 described herein may also be used as the standby display for the aircraft. Most aircraft include one or more standby indicators that may be used in the unlikely event that a main display device (e.g., a navigation screen of the ND, a primary piloting screen of the primary flight display (PFD), etc.) or one of the avionics systems 200 (e.g., an air data and inertial reference system (ADIRS), the FMS 208, etc.) that supply information to a main display device becomes degraded or otherwise inoperable. The standby indicators, which may sometimes be referred to as integrated standby flight displays (ISFD) or integrated standby indicator systems (ISIS), are generally powered from an independent power supply, such as one or more rechargeable batteries, and are used to compute and display minimal information needed to fly and land the aircraft (e.g., airspeed, altitude, and attitude). Typically, a standby indicator must be visible to both the pilot and copilot at all times. To meet this requirement, one standby indicator is typically mounted on the instrument panel between the pilot and copilot.

Figure 6:
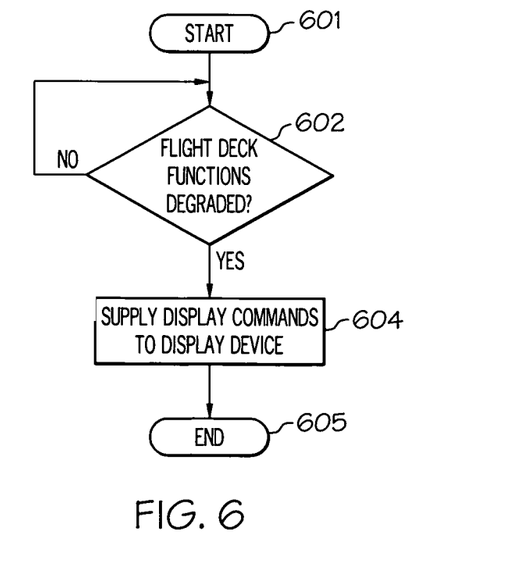
FIG. 6, depicts a process, in flowchart form, for selectively implementing the functionality of a standby indicator on the EFB of FIG. 1.

Because the EFB 100 is independent of flight deck, it may, when implemented as a Class 3 type EFB, be used to implement the function of the standby indicator. As such, the standby indicators presently included in aircraft could be eliminated, thereby saving weight and cost. To implement the functionality of a standby indicator, the processing system 104 in the EFB 100 is configured to receive data from, for example, various aircraft displays and various ones of the aircraft avionics systems 200, that are representative of flight deck operability. As shown in FIG. 6, the processing system 104, based on these data, determines whether the functions of the flight deck are degraded or otherwise inoperable (602). If the processing system 104 determines that the flight deck functions are degraded, it supplies display commands to the display device 102 that causes the display device 102 to render images that a conventional standby indicator provides (604). For example, the EFB display device 102, using data received from appropriate sensors and/or sensor systems, will render appropriate images of airspeed, aircraft altitude, and aircraft attitude, either simultaneously, individually, or in various combinations in response to input from a user.

EFB Communications-Related Functions

Returning once again to FIG. 2, it was previously noted that the EFB 100 may be configured to be selectively in communication with a plurality of wireless sub-networks 230. It was also noted that the number and type of wireless networks may vary, and may include various WiFi networks, various WiMAX networks, various wireless IP networks, or any other wireless network protocol now known or developed in the future. Moreover, the EFB 100 may be configured to access the wireless sub-networks via any one, or plurality, of suitable devices. Such devices include various USB, Ethernet, and PCMCIA based wireless communication devices, or any other wireless communication device now known or developed in the future.

In addition to being configured to access the wireless sub-networks 230, the EFB 100 is preferably configured to manage the priority of each the wireless sub-networks 230. That is, the EFB 100 may be configured to communicate wireless via a particular preferred wireless sub-network. However, if this preferred wireless sub-network were inoperable or otherwise unavailable, then the EFB 100 would reconfigure itself to communicate wirelessly via the next lower priority wireless sub-network, and so on until a wireless sub-network is available. It will be appreciated that the priority in which the wireless sub-networks 230 are placed may vary, and may depend upon various factors such as bandwidth and cost.

The types of communications that the wireless sub-networks 230 may be used for may also vary. For example, the wireless sub-networks 230 may be used for pilot communications (both voice and text) to ground stations, other aircraft, or both. The wireless sub-networks 230 may also be used to receive various airline-specific communications, various aircraft-specific communications, and data transmissions for the IFE 220. It will be appreciated that in some embodiments this additional communication capability could reduce the load on the aircraft central communication unit (CMU) or may allow elimination of the CMU altogether.

The EFB 100 may also supply data to the aircraft IFE 220. To do so, the EFB 100 may be in operable communication directly with the aircraft IFE or, as FIG. 2 depicts, the EFB 100 may be in operable communication with the aircraft IFE 220 via a broadband feeder 222 or other suitable device. No matter the specific manner in which the EFB 100 communicates with the IFE 220, it will be appreciated that such functionality may reduce the overall size and weight associated with the aircraft IFE 220. For example, rather than storing various entertainment content (e.g., movies, audio content, etc.) on-board the aircraft, this content may be selectively transmitted (either automatically or in response to a command) to the EFB 100, via one of the wireless sub-networks 230, and then supplied to the IFE 220. It will be appreciated that this data transmission may occur while the aircraft is on the ground or while it is in flight. Currently, maintenance personnel manually load such IFE content, which is time-consuming and also relies upon repositories for maintaining the IFE data, both of which may incur substantial costs.

In addition to various video and audio entertainment data, the EFB 100 may also receive and supply to the IFE 220 various news, weather, and sports data that are received by one or more of the wireless sub-networks 230 in real time. The wireless sub-networks 230, EFB 100, and IFE 220 could be configured to provide Internet access, access to various types of video games, and access by passengers to airline ticketing stations.

The EFB 100 may also be configured to implement the function of an ACARS (Aircraft Communications Addressing and Reporting System) Data Recorder. The ACARS Data Recorder is a separate LRU that records all of the ACARS messages that are sent to and received from the ground. Presently, ACARS messages are transmitted and received via VHF, HF, or satellite radios. Depending upon whether the aircraft is equipped with a CMU, the EFB 100 may transmit, receive, process, and store ACARS messages either directly or via the CMU. Because the EFB 100 has plenty of storage capacity, unlike current ACARS Data Recorders, the oldest ACARS message need not be deleted. Moreover, because the EFB 100 may communicate via multiple sub-networks, the stored ACARS messages may be down-linked to the ground via any one of the available sub-networks or per an aircraft owner's preference. In some embodiments, the EFB 100 may also implement an ACARS message data analyzer. Preferably, this analyzer is configured to analyze the stored ACARS message data and verify that the directions given by ATC/AOC are consistent with the current flight plan. If not, the EFB 100 may generate and displays warnings to the pilot.

The EFB 100 may also be configured to implement the function of the aircraft cockpit voice recorder (CVR). As is generally known, the CVR records the audio environment in the cockpit. The stored audio may then be used to assist investigators following various aircraft incidents. To implement this functionality in the EFB 100, a microphone 203 (see FIG. 2) is interfaced with the EFB 100. The microphone 203 is disposed within the aircraft cockpit to pickup the audio sounds within the cockpit environment and supplies audio signals representative thereof to the EFB 100. The EFB 100, upon receipt of the audio signals, converts the audio signals to digital data, compresses the digital data, and stores it in memory. As with the ACARS data described above, the stored CVR data may be down-linked to the ground via any one of the available sub-networks or per an aircraft owner's preference.

EFB Maintenance-Related Functions

The EFB 100 may, in some embodiments, be coupled to receive the same data that are normally transmitted from the FDAU 212 to a quick access recorder (QAR). As is generally known, the QAR receives and stores data that are transmitted from the FDAU 212 to the aircraft flight data recorder (not depicted). Upon landing of the aircraft, these data may then be transmitted, via wired or wireless communication, to ground personnel for processing and analysis. The depicted EFB 100, however, is configured to process the QAR data in real-time, and store only the processed data in, for example, the data storage device 106. The processed QAR data may be transmitted to ground personnel, either upon aircraft landing or in real-time, for further analysis. The processed data may also be selectively displayed on the EFB display device 102. The format in which the QAR data are displayed may vary, but preferably the QAR data are analyzed in a manner that allows the data to be displayed graphically over time, so that graphical trends may be observed either by the pilot, if the aircraft is in flight, or maintenance personnel, if the aircraft is on the ground. It will be appreciated that this added functionality of the EFB 100 reduces the weight and cost associated with the QAR, and utilizes far less bandwidth since only the processed data re being transmitted from the aircraft.

In addition to receiving and processing QAR data, the EFB 100 may also be configured to receive and store, at least temporarily, data representative of maintenance activity performed on the aircraft. These data could also be available for transmission, when needed or desired, for use by ground personnel. The data may be stored, for example, in the data storage device 106.

The EFB 100 may additionally, at least in some embodiments, implement the data loading functionality of the aircraft onboard data loader (ODL). That is, the EFB 100 may receive data associated with various LRU updates and/or upgrades, and selectively transmit these updates and/or upgrades to the associated LRU(s). The EFB 100 may furthermore store maintenance and health data associated with various aircraft LRUs. In addition, the EFB 100 may be configured to generate maintenance reports, and automatically down-link the maintenance reports to a ground server and/or air traffic control (ATC) for clearance, thereby reducing the paper work associated with such tasks.

The EFB 100 may also implement the functionality of a maintenance terminal. A maintenance terminal is typically used by a ground technician to conduct pre-flight health checks of the aircraft LRUs. Preferably, a maintenance interface software suite resides on the EFB 100, for example in the storage device 106, and may be selectively implemented by the EFB 100 to connect to the maintenance host on the aircraft to perform pre-flight LRU status tests on various aircraft LRUs when the aircraft is on ground.

Figure 7:
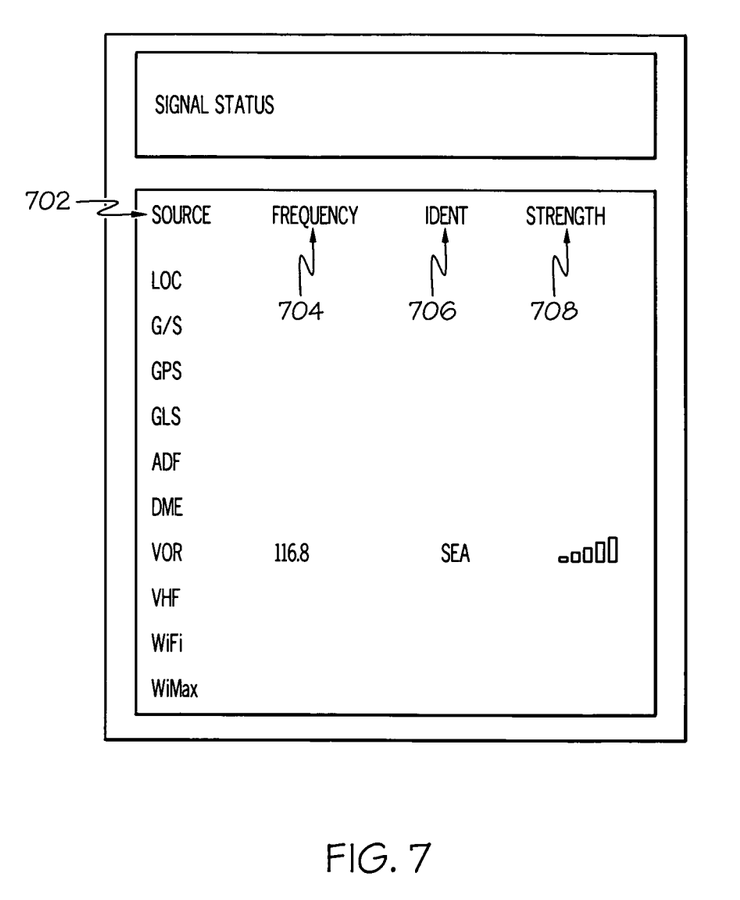
FIG. 7 depicts an exemplary manner in which a signal status page may be rendered on the EFB.

An aircraft receives transmissions from numerous and varied signal sources. Unfortunately, a flight crew may be unaware that a signal source is unavailable or otherwise inoperable. In many instances, it might be desirable that a flight crew be aware ahead of time that a signal is unavailable. For example, if a pilot tunes to receive a particular signal, but the associated transmitter is not transmitting that signal, the pilot need to haphazardly tune to receive another signal or depend on communication from the ground for information on available signals. It would thus be advantageous to know in real-time the status of various signals that the aircraft may receive. In this regard, the EFB 100 may, at least in some embodiments, allow a pilot to select a function in which a signal status page is displayed on the EFB display device 102.

The particular manner in which the signal status page may be displayed on the EFB display device 102 may vary. One exemplary configuration is depicted in FIG. 7. In the depicted embodiment, the display page lists each signal source 702, its frequency 704, its associated identifier (if applicable) 706, and its relative signal strength 708. The signal sources may be continuously displayed and selectively illuminate based on the phase of flight, or the sources may only be displayed during certain flight phases. For example, LOC and G/S may be listed, but not illuminated during aircraft cruise operations, and then be illuminated during an approach, after receiving stimulus from, for example, the FMS 208. Alternatively, LOC and G/S may not be displayed at all during aircraft cruise operations, but displayed only during an approach.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electronic flight bag for an aircraft that has an associated flight manual, the electronic flight bag comprising:
   a display device coupled to receive display commands and operable, in response thereto, to render various images; and
   a processing system in operable communication with the display, the processing system configured to receive fault data from one or more aircraft systems and operable, upon receipt of the fault data, to (i) determine a page in the associated flight manual that corresponds to the received fault data and (ii) supply display commands to the display device that cause the display device to automatically render an image of the determined page in the associated flight manual,
   wherein the processing system is further configured to:
      receive health data from a plurality of aircraft displays and aircraft avionics that are representative of flight deck operability,
      determine, upon receipt of the health data, whether one or more flight deck functions are degraded; and
      upon determining that one or more flight deck functions are degraded, to selectively supply display commands to the display device that cause the display device to render images representative of a standby indicator.

2. The electronic flight bag of claim 1, wherein:
   the rendered flight manual page includes text;
   the processing system is further operable to selectively convert the text to speech data representative thereof; and
   the electronic flight bag further comprises an audio sound generator coupled to receive the speech data and operable, upon receipt thereof, to generate audible sounds representative thereof.

3. The electronic flight bag of claim 1, wherein the processing system is further operable to selectively supply display commands to the display device that cause the display device to display one or more videos associated with the fault data.

4. The electronic flight bag of claim 1, wherein the processing system is further operable, upon receipt of the fault data, to selectively initiate transmission of the fault data to a remote receiver location.

5. The electronic flight bag of claim 4, wherein the processing system is further operable to determine a severity level of the fault data and, based on the determined severity level, initiate the transmission of the fault data to the remote receiver location.

6. The electronic flight bag of claim 1, wherein:
   the processing system is further configured to receive data representative of aircraft flight phase and is further operable, in response thereto, to selectively supply display commands to the display device that cause the display device to render a checklist from the associated flight manual that is appropriate for the aircraft flight phase.

7. The electronic flight bag of claim 6, wherein the processing system is further operable to selectively supply display commands to the display device that cause the display device to display one or more videos that depict how to implement one or more items in a rendered checklist.

8. The electronic flight bag of claim 1, wherein the processing system is further configured to receive quick access recorder (QAR) data from a QAR device and is further operable, upon receipt of the QAR data, to (i)

perform trend analyses of the QAR data and (ii) selectively supply display commands to the display device that cause the display device to display trends of the QAR data over time.

9. The electronic flight bag of claim 8, wherein the processing system is further operable to selectively initiate transmission of the trend analyses of the QAR data to a remote receiver location.

10. The electronic flight bag of claim 1, further comprising:
a data storage device in operable communication with the processing system and configured to store data,
wherein the processing system is further configured to receive health data associated with a plurality of line replaceable units (LRUs) and operable, upon receipt of the health data, to store the health data on the data storage device.

11. The electronic flight bag of claim 10, wherein the processing system is further operable to selectively initiate transmission of the health data to a remote receiver location.

12. The electronic flight bag of claim 1, further comprising:
a wireless communication interface in operable communication with the processing system, the wireless communication interface configured to selectively communicate with a plurality of extensible wireless networks.

13. The electronic flight bag of claim 12, wherein the extensible wireless networks include one or more WiMax networks, WiFi networks, and wireless IP networks.

14. The electronic flight bag of claim 12, wherein the processing system is further operable to determine signal strength of at least each of the plurality of extensible wireless networks and selectively supply display commands to the display device that cause the display device to render images representative of the signal strength of each of the plurality of extensible wireless networks.

15. The electronic flight bag of claim 12, wherein the processing system is further operable to:
selectively command the wireless communication interface to retrieve, via one of the plurality of extensible wireless networks, entertainment media data from a remote transmitter; and
selectively communicate with, and transmit the entertainment media data to, an aircraft in-flight entertainment server for use by an aircraft in-flight entertainment system.

16. The electronic flight bag of claim 15, further comprising:
an audio input configured to receive voice communications from a pilot and operable, upon receipt of the voice communications, to supply voice signals representative thereof,
wherein the processing system is coupled to receive the voice signals and is further operable, upon receipt thereof, to selectively convert the voice signals to textual characters.

17. The electronic flight bag of claim 1, wherein the processing system is further adapted to at least selectively receive aircraft position data, planned approach data, and navigation data, and is further operable, in response to these data, to supply display commands to the display device that cause the display device to render, in real-time, a planned approach path, actual aircraft approach path, and actual aircraft position.

18. The electronic flight bag of claim 17, wherein the processing system is further operable to selectively retrieve an approach chart and supply display commands to the display device that cause the display device to render an image of retrieved approach chart.

19. The electronic flight bag of claim 18, wherein the planned approach path, actual approach path, and actual aircraft position are overlaid onto the rendered approach chart.

20. The electronic flight bag of claim 19, wherein the planned approach path, actual approach path, and actual aircraft position are each rendered in a different color.

21. The electronic flight bag of claim 1, wherein the processing system is configured to selectively receive flight plan data and supply display commands to the display device that cause the display device to render the flight plan data in a format consistent with that of an aircraft navigation display.

* * * * *